United States Patent [19]

Hedberg

[11] Patent Number: 5,046,360

[45] Date of Patent: Sep. 10, 1991

[54] AERODYNAMIC PROBE INTERNAL CONSTRUCTIONS

[75] Inventor: Eric A. Hedberg, Burnsville, Minn.

[73] Assignee: Rosemount Inc., Eden Prairie, Minn.

[21] Appl. No.: 451,437

[22] Filed: Dec. 15, 1989

[51] Int. Cl.[5] .................... G01C 21/00; G01F 1/46
[52] U.S. Cl. .................................. 73/182; 73/861.68
[58] Field of Search ............ 73/182, 183, 180, 861.65, 73/861.66, 861.67, 861.68

[56] References Cited

U.S. PATENT DOCUMENTS

| | | | |
|---|---|---|---|
| 2,977,793 | 4/1961 | Bucalo | 73/180 |
| 2,984,107 | 5/1961 | Strieby et al. | 73/212 |
| 3,482,445 | 12/1969 | De Leo et al. | 73/182 |
| 4,192,178 | 3/1980 | Wyler | 73/116 |
| 4,275,603 | 6/1981 | Kalocsay | 73/182 |
| 4,836,019 | 6/1989 | Hagen et al. | 73/180 |

Primary Examiner—Donald O. Woodiel
Attorney, Agent, or Firm—Kinney & Lange

[57] ABSTRACT

A short, strut mounted, multifunction air data sensing probe providing reduced drag, weight and radar cross-section has a modular internal construction providing a multiple passageway pressure assembly to transfer sensed pressure signals from individual sensing ports on a probe barrel to pressure carrying conduits extending into the mounting- strut of the probe. The modular construction eliminates the need for having interior chambers made by fixing a series of difficult to locate bulkheads on the probe, interior, with separate lines running from each of the chambers to provide the pressure signal from each of the ports. The modular construction also permits mounting a deicing heater on internal parts other than the outer probe shell so that the manufacture of-the probe is further simplified, and the types of material used for the probe shell can be changed without concern about heater mounting.

17 Claims, 3 Drawing Sheets

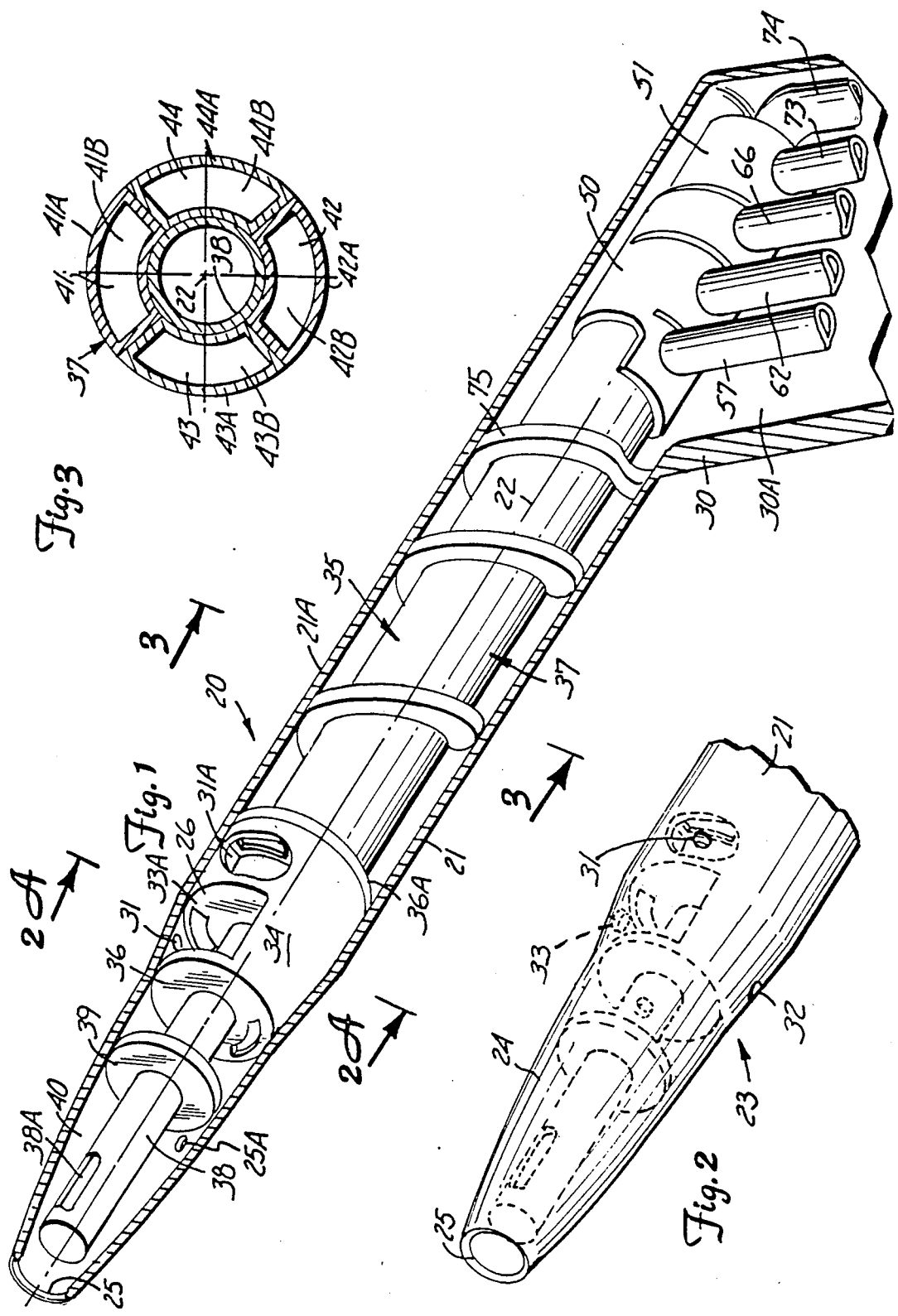

AERODYNAMIC PROBE INTERNAL CONSTRUCTIONS

BACKGROUND OF THE INVENTION

1. Field of the Invention

The present invention relates to air data sensors constructed to maintain very compact outer dimensions and yet be relatively easy to manufacture.

2. Description of the Prior Art

The need to reduce drag on aircraft has brought about continued development of air data sensors that will provide multifunction pressure signals from a single probe, to minimize adding instruments which are in the air stream. Likewise, the sensors have been reduced in size to minimize radar target size as well as to minimize drag. Manufacturing considerations for the internal passageways carrying pressure from a plurality of ports on a single probe barrel have limited probe barrel size reduction because with individual tubes and bulkheads forming chambers for each of the ports, it becomes very difficult to install heaters, and a plurality of individual pressure signal carrying tubes in extremely small diameter barrels.

The present invention provides structure for coupling pressure from the pressure sensing ports to pressure output tubes so that the internal construction can be made with relatively small diameter, precision made standard parts that will be usable on a wide number of different models of air data sensors. Additionally, the placement of the heaters in one form of the invention permits use of materials other than nickel or metal alloys for the barrel or tube itself.

Various probe designs can be made as shown in the prior art utilizing five pressure signals. Multifunction probes are presently available that provide signals to determine air speed, static pressure, angle of attack and angle of sideslip, and which have outer configurations that are designed to provide compensation for mounting configuration disturbances.

SUMMARY OF THE INVENTION

The present invention relates to air data sensing probes having an internal construction for carrying pressure signals from a plurality of ports on the probe to conduits at the probe support. The past arrangements of heater, bulkheads and individual tubes have increased the size of probes because of the need to be able to fabricate the assemblies, and the present invention replaces the prior bulkhead arrangement with a concentric tube bundle of a plurality of individual tubes, with a connection component having multiple isolated passageways at the base end of the probe barrel. The probe then can be made smaller because substantially all of the cross-section of the probe barrel is utilized for routing the pressure signal carrying tubes and the heater elements while still sealing or isolating the ports from one another. An additional feature is that the assembly, including the tube bundle, can carry a heater element if desired, so that problems with mounting a heater on the interior of the probe barrel are eliminated.

Because the probe can be made smaller, it has less drag, weight, and radar cross-section. Further, the construction can be made modular, since the internal construction can be the same for probes which have different outer configurations. With the reduction in size, it becomes practical to use molded composite type materials in place of metal (normally nickel) that is used for the outer probe barrel and for other structural parts. Composite materials will further reduce weight and radar cross-section.

Two embodiments of the invention are shown, one which provides for pressure passageways being formed by individual tubular members mounted around a central tube that receives the pitot pressure (usually from a front facing, centered or axial port). A second form of the invention utilizes a single plug member having grooves therein that define pressure carrying conduits, and a central passageway for the pitot pressure. The unitary assembly then has a multiple passageway isolated outlet assembly at its rearward portion, where the probe is mounted to the air vehicle, that provides for connection to remote conduits that lead to the specific instruments or sensors that are desired.

The present invention permits very small, compact probes wherein the size limitations caused by conventional fabrication techniques are minimized.

Another advantage is that the present construction permits the sensing ports to be placed much closer together and closer to the leading end of the probe, so that short probes, where the sensing ports are on a tapered forward portion of the barrel, can be connected to their respective instruments though the present passageway assembly very efficiently and effectively.

BRIEF DESCRIPTION OF THE DRAWINGS

FIG. 1 is a perspective view of a typical sensor made according to a first form of the invention parts in section and parts broken away; FIG. 2 is a perspective view of a leading end of a sensor showing sensing ports defined in the outer barrel;

FIG. 3 is a sectional view taken generally along line 3—3 in FIG. 1;

DETAILED DESCRIPTION OF THE PREFERRED EMBODIMENTS

Figure 2A:
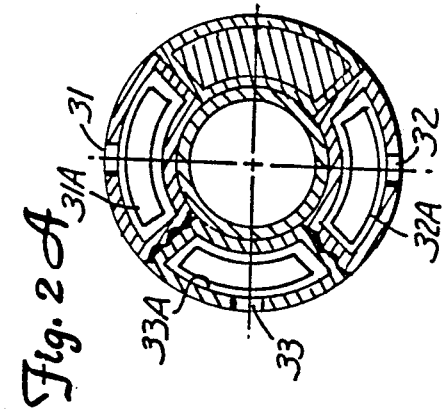
FIG. 2A is a sectional view taken on line 2A—2A in FIG. 1.

A multifunction air data sensor or probe indicated generally at 20 as shown is of the type that can measure angle of attack, mach number, and provide readings that indicate static pressure. The air data sensor, includes a barrel or shell indicated generally at 21 which is formed in its main portion as an elongated cylinder 21A, having a central longitudinal axis 22 (FIG. 3). The forward end 23 of the air data sensor barrel or shell 21 has a tapered forward surface 24 that has a pitot port 25 for sensing impact pressure at the forward (leading) end thereof. The pitot port 25 is a sharp-edged port. The tapered surface 24 expands in downstream direction relative to the longitudinal axis 22 for a selected distance. A small hole 25A may be used to drain water which enters port 25. If desired, a surface section may be formed to have a greater included angle than the section 24, for providing a compensating pressure disturbance, as is known in the prior art. The surface 24 joins the cylindrical section 21A.

As can be seen, the shell or barrel 21 is mounted onto a mounting strut 30 that is adapted to be mounted onto the side of an aircraft. The longitudinal axis 22 of the barrel is held in a known position relative to the aircraft axis so that changes in the orientation of the probe longitudinal axis 22 relative to a horizontal reference plane will give an indication of angle of attack of the aircraft. The angle of side slip also may be determined with a probe using the interior manifold construction of the present invention by providing appropriately positioned sensing ports.

In addition to the pitot port 25, there is a first set of ports 31 and 32 positioned at the top and bottom of a barre or shell 21, and there is a port 33 that has an axis 90° to the axes of ports 31 and 32. The axes of ports 31 and 32 are coincident axes. Measuring side slip would require a port to be provided on the same axis as the axis of port 33 but on the opposite side of the probe from port 33. The port 33 is used to provide a static pressure signal.

The ports 31 and 32 are used for individually obtaining pressure signals that indicate the angle of attack of the aircraft. With proper compensation and calculation using derived formulas known in the prior art, angle of attack, static pressure, and with the pitot pressure, mach number can be obtained from the signals.

The pressure signals from ports 31 and 32 are kept isolated or separated by suitable blocks or walls 34 and 34A which are provided between the ports which are on common axes. Wall 34A is on the opposite side of the probe from block 34. The pressure signals from ports 31, 32 and 33, and from pitot port 25 are transmitted to remote conduits for use in a desired manner through a multiple passageway assembly indicated generally at 35 which includes bulkhead disks 36, 36A and 39 that fit within the inner surface of the barrel, including the tapered forward section. Bulkheads and blocks or walls 34 and 34A form chambers indicated at 31A-33A in FIG. 2A. These chambers open into individual tubes of a multiple tube bundle 37 which is rearwardly of a bulkhead 36A. A central tube 38 forms a support for the bulkheads and the tube bundle 37. Bulkhead 39 forms a pitot pressure chamber 40 to the rear of pitot port 25. The tube 38 opens to the chamber 40 through one or more ports 38A and is thus connected to the pitot port.

The tube bundle 37 is shown in FIG. 3, and is formed of a plurality of individual part annular cross-section tubes 41, 42 (for the ports 31 and 32), and 43 (for the port 33). A tube 44 that would be used as a port for measuring angle of side slip is provided, but in this form of the invention this tube does not carry a pressure signal. The tubes have outer part-cylindrical walls indicated at 41A-44A and define interior passageways 41B-44B. The tubes also have radially extending walls and part-annular inner walls that fit around the tube 38 that carries the pressure from the pitot port. The tubes 41-44 form cylindrical-shaped bundle 37 as shown in FIG. 1. The tubes can be suitably joined together by welding or in another suitable manner to form tube bundle 37.

The passageways of the tube bundle form a multiple passageway portion that is concentric with the central axis 22, because the tubes are formed around and are concentric with the tube 38 carrying the pitot pressure. The tube bundle 37 and tube 38 substantially fill an internal cross section with no wasted space between the pressure passageways. This efficient use of internal cross section allows for a reduced probe cross section with corresponding reductions in drag and radar cross section.

Figure 4:
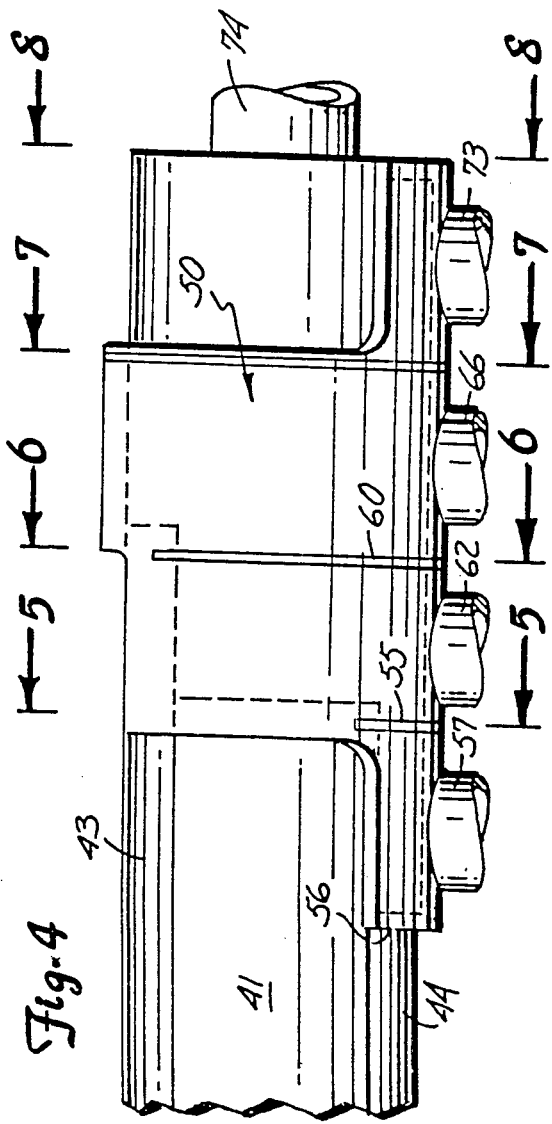
FIG. 4 is a top plan view of an outlet for attaching conduits for transferring pressure signals to remote instruments and rotated 90° from FIGS. 1-3.
Figure 8:
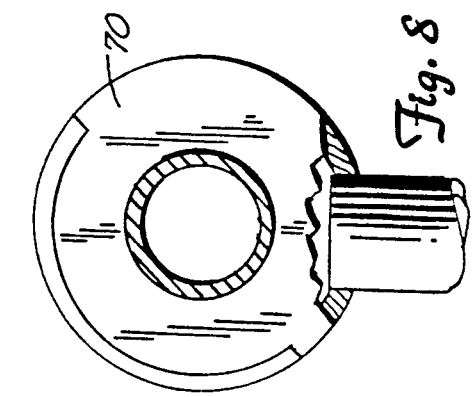
FIG. 8 is a sectional view taken along line 8—8 in FIG. 4.
Figure 7:
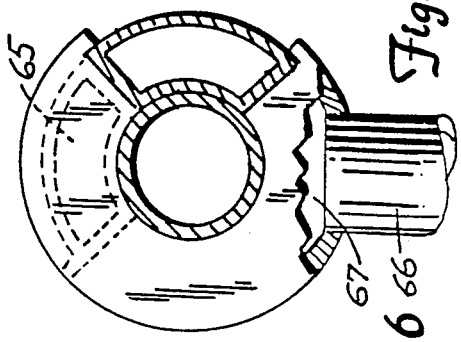
FIG. 7 is a sectional view taken along line 7—7 in FIG. 4.

Assembly 35 includes a transition section 50 for connection of conduits or tubes carrying pressure signals from the tubes in bundle 37 to instrumentation on the aircraft. The transition section 50 forms part of the assembly 35 and comprises an outer sleeve 51 that wraps around the tube bundle 37. The sleeve 51 is not fully annular, as can be seen in FIGS. 4-8 in particular, but is formed to enclose the tubes 41-44 which are terminated and connected to conduits at different axial locations along the longitudinal axis 22. The interior of the transition section 50, as shown in FIG. 4 and in the sectional views for FIGS. 5-8, has part annular walls of bulkheads to seal off the rear openings of the individual tubes 41-44 at different axial positions so that the pressure signal from each of the individual tubes 41-44 are isolated or seal from one another and can be provided to an individual line or conduit leading through the strut to remote instruments. It should be noted that FIG. 4 is rotated 90° from FIGS. 1 and 3 so tube 44 is on the bottom and the connection conduits extend downwardly in FIGS. 5-8.

The transition section has a bulkhead wall 55 forming a quarter of a circular segment that forms a chamber 58 to the rear of the tube 44. A pressure port is defined in the wall of the sleeve 51 and a pressure output line or conduit 57 is connected to the chamber formed by bulkhead wall 55. The tube 44 ends just rearwardly of front edge 56 of sleeve 51. Chamber 58 is formed by sleeve 51 and bulkhead wall 55 and the walls of the adjacent tubes 41 and 42, and tube 38.

Figure 6:
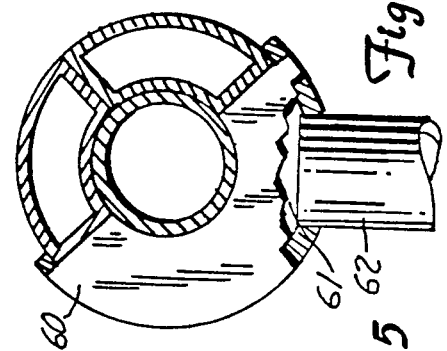
FIG. 6 is a sectional view taken along 6—6 in FIG. 4.
Figure 5:
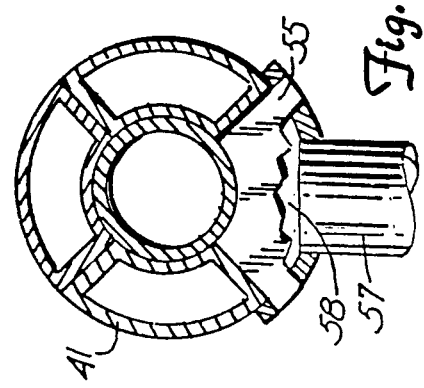
FIG. 5 is a sectional view taken along 5—5 in FIG. 4.

A second tube, for example the tube 41, is terminated in a chamber formed with a half-circle bulkhead wall 60 shown in FIG. 6. A pressure signal can be taken off tube 41 through an output line or conduit 62. Half-circle bulkhead 60 closes off a chamber 61 and that extends about 180°. Tube 41 terminates rearwardly of bulkhead wall 55, and walls 55 and 60 define the chamber 61 together with the wall of sleeve 51 and side walls of tubes 43 and 42. Tube 41 opens into chamber 61, and line 62 also opens to chamber 61.

The bulkhead walls are soldered or otherwise sealed in place. If synthetic materials are used, the bulkhead walls can be cemented into position.

A third tube, for example tube 43, extends beyond the bulkhead 60, in downstream direction and opens to a chamber 67 formed at the rear thereof by a three-quarter circular section bulkhead wall 65 and at the front by bulkhead wall 60. The sleeve 51 and the side walls of tube 42 also define the walls of chamber 67 along with the outer surface of tube 38. The fluid pressure from tube 43 is transferred to a line or conduit 66 attached to sleeve 51.

The fourth tube, for example tube 42, extends downstream toward the rear end of the manifold transition section 50. The tube 42 ends rearwardly of bulkhead wall 66 and opens into a chamber 71 formed by a full circle annular bulkhead 70 and wall 66. The chamber 71 is an annular chamber and a line or conduit 73 is open to chamber 71 through sleeve 51. Line 73 leads to remote instruments.

The pitot pressure carrying tube 38 is connected at the rear of the transition section 50, to a conduit or line 74 which leads to remote instruments. The bulkhead walls 55, 60, 65, and 70 are all fitted around the line or tube 38 and the tube 38 forms a central support for the manifold assembly.

The manifold assembly 35 can be slipped into the outer barrel quite easily, and can be manufactured separately from the shell or barrel. It is more simple to manufacture and seal the bulkheads and tubes outside of the barrel. A deicing heater indicated generally at 75 can be wrapped on the outside of the tube bundle 37 and be supported thereon, and suitable leads are then connected to wires extending through the strut 30 for power. Since the outer shell or barrel does not have to have the heater embedded in it, or otherwise fixed to its wall, the barrel can be made of composite materials, as can the tube bundle 37.

The construction makes it possible to have smaller outer barrels, because of the simplicity of constructing the manifold assembly and slipping it into place before securing it to the barrel or shell in a suitable manner. The manifold assembly can be secured with various cements or adhesives, or by soldering or brazing in place if desired. The front bulkheads 26, 36 and 36A can be slid against the inner surface of the barrel and fitted to provide for adequate pressure seals.

Figure 9:
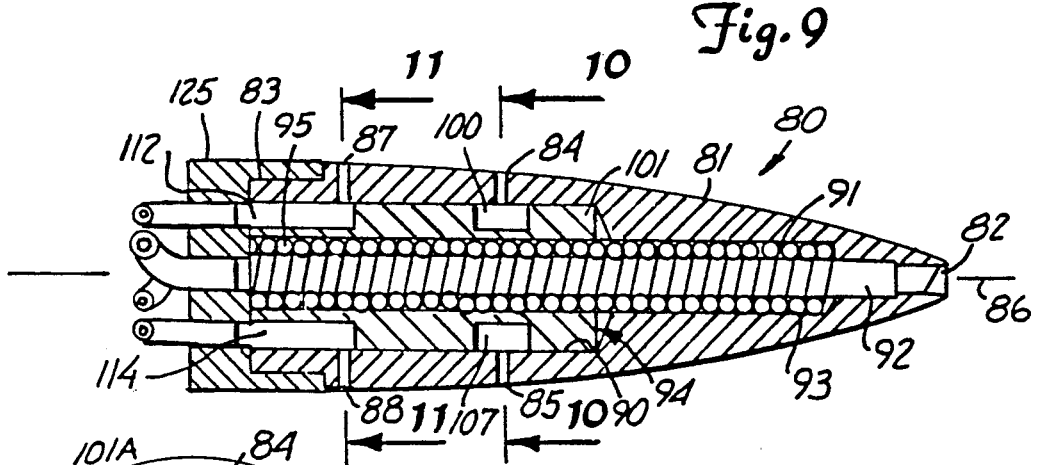
FIG. 9 is a vertical sectional view of an air data sensor having a modified pressure carrying assembly made according to the present invention.

If composite materials are used, weight is reduced and the radar cross-section is also reduced. In a second form of the invention, a short probe again is used with an internal manifold, and as can be seen in FIG. 9, a short probe indicated generally at 80 is made to have a generally tapered outer surface 81, and a sharp-edged pitot port 82 at the leading end thereof. The probe has a mounting hub surface 83 at its rearward end, that can be used for mounting the probe barrel onto a suitable transition section or cap and support structure such as a strut.

This probe also has a pair of ports 84 and 85 on the top and bottom of the probe, which have axes that lie on a common plane at a first location along the longitudinal axis 86. Additionally, in this particular probe, ports 87 and 88, respectively, are formed through the wall of the barrel of the probe downstream from and aligning with the ports 84 and 85 in longitudinal direction. The ports open through the wall of the probe. A bore 90 is defined in the center of the probe barrel.

The leading end of the probe also has a bore indicated at 91 therein that opens to a central leading bore 92 carrying the pressure signal from the port 82. A helically wound electrical heater 93 is slipped into bore 91 and has an open central passageway of about the same size as bore 92. The heater conduit can be held in place in a suitable manner and the bore 90 mounts a multiple passageway assembly indicated generally at 94 which in this form of the invention comprises a unitary block that has an interior bore 95 of size to receive the heater 93 and provide a passageway for pitot pressure.

Figure 10:
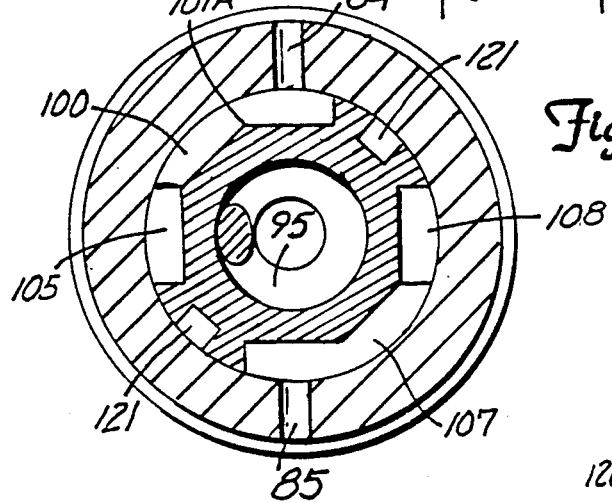
FIG. 10 is a sectional view taken as on line 10—10 in FIG. 9.

The ports 84, 85, 88 and 87 are made so that they open to the bore 90, and are then suitably isolatingly connected to passageways in the assembly 94. For example, as can be seen in FIGS. 9 and 10, the port 84 opens into a part-annular passageway or chamber 100 as can be seen in FIG. 10. A front wall or bulkhead 101 closes off passageway 100. The part annular passageway 100 is formed in part by an interior wall section 101A and extends partway around the central axis 86. A longitudinally extending passageway 105 that is centered at an approximately horizontal plane indicated at 96 in FIG. 10 opens to passageway 100.

Port 85, which is diametrically opposite from the port 84, opens into a part-annular passageway 107, which also extends around the central axis 86. A passageway 108, that extends longitudinally along the barrel opens to part-annular passageway 107. Passageway 108 can also be seen in FIG. 11, which is a section taken through the axes of ports 87 and 88. The rear of the passageways 100 and 107 are formed by a bulkhead wall 110.

Figure 11:
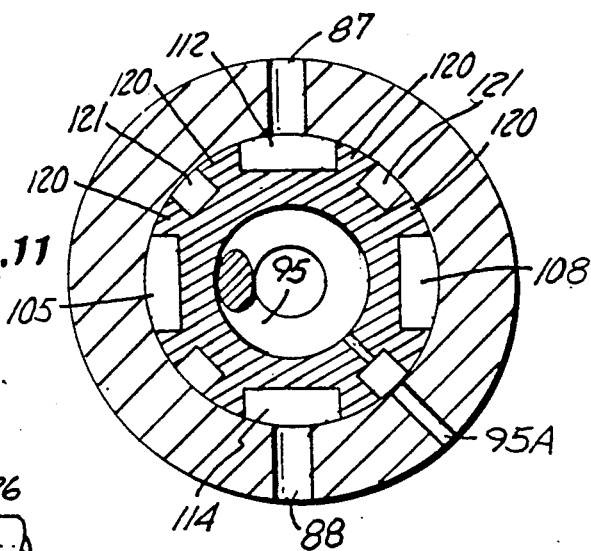
FIG. 11 is, a sectional view taken as on line 11—11 in FIG. 9.
Figure 12:
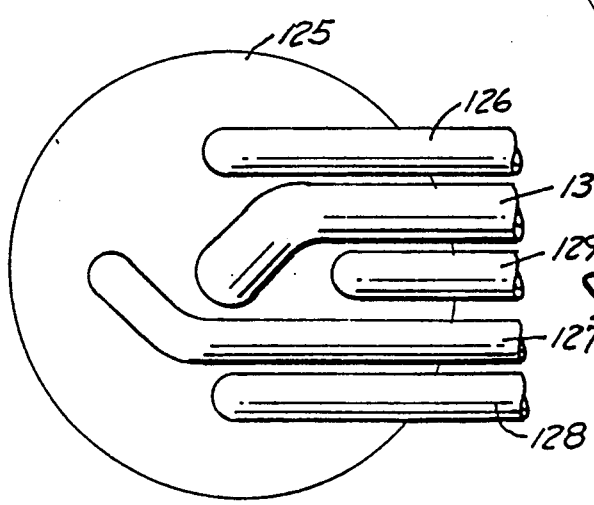
FIG. 12 is a rear view of the device of FIG. 9 showing a pressure output tubes thereon.

Ports 87 and 88 open into separate longitudinally extending passageways, as can be seen in FIG. 11. The port 87 opens into a passageway 112 formed or defined directly in the assembly 94 through bulkhead wall 110. Passageway 112 extends longitudinally and is separated from and centered 90° from the passageways 108 and 105.

The port 88 opens into a passageway 114 that also extends longitudinally through bulkhead wall 110 and is diametrically opposite from the passageway 112. A pair of guide ribs indicated at 120, 120 are formed between the adjacent passageways between bulkhead walls 101 and 110 and serve to seal the passageways from each other, so the pressure signals are kept separate or isolated and to provide surfaces that will slide on the interior of the bore 90, and support the manifold properly for use. These guide ribs 120 are formed by the respective adjacent passageways and a longitudinally extending slot 121 (for solder) formed between each set of ribs.

The passageways can easily be connected into a housing or cap 125 that fits over the shoulder or hub 83, for example. The cap has suitable passageways that mate with the respective passageways 92, 105, 108, 112 and 114. The individual passageways open to conduits shown at 126 for the passageway !12 127 for the passageway 105; 128 for the passageway 114; and 129 for the passageway 108. Additionally, a conduit 131 is used for carrying the pi tot pressure from the passageway 92 to remote instruments. A small opening 95A can be provided to drain water from the pitot passageway.

These conduits can be run down a strut for the air data sensing probe, or if the probe is mounted on a boom or similar support, the conduits can be run directly through the boom or support that might fit on the hub 83.

Again, a very short and small diameter probe can be made because the internal manifold assembly can be separately manufactured and slid into place, and fastened securely with suitable methods, such as soldering or with suitable cements. There is substantially no wasted space in the cross section. It is not necessary to have a large number of separated bulkheads with individual tubes carrying the various pressure signals.

Although the present invention has been described with reference to preferred embodiments, workers skilled in the art will recognize that changes may be made in form and detail without departing from the spirit and scope of the invention.

What is claimed is:

1. An air data sensing probe for determining air data parameters of fluid moving past the probe, and including an elongated probe barrel with a longitudinal axis, said probe barrel having a plurality of port means in the walls thereof for sensing pressures of a fluid relative, to which the probe is moving, a separate assembly internal of the probe for carrying individual pressures from each of the port means comprising a support, axially spaced bulkhead means fixed with respect to the support for engaging the inner surface of the probe barrel and adapted to be sealingly mounted thereagainst, wall means between the bulkhead means to define at least first and second annularly extending chambers between adjacent bulkhead means, each of said first and second chambers being open to at least one different port, and means on the assembly forming longitudinally extending passageways for carrying fluid pressures open to each of the first and second chambers and extending from a leading end of said barrel toward a trailing end of said barrel.

2. The apparatus as specified in claim 1 wherein the bulkhead means define at least two axially spaced main chambers, the first and second chambers together forming one main chamber, with each chamber formed having a separate port opening thereto.

3. The apparatus as specified in claim 1 wherein said means forming said longitudinally extending passageways comprise individual tube members supported as a bundle and having ends open to the respective chambers.

4. The apparatus as specified in claim 1 and a transition section at a trailing end of said barrel, said transition section including a sleeve surrounding the means forming the longitudinally extending passageways, wall means for individually terminating each of said longitudinally extending passageways in part-annular chambers formed at said transition section, and conduit means open to each of said part-annular chambers, said conduit means having axes that lie generally along a common plane where they join the wall means.

5. The apparatus as specified in claim 4 wherein said assembly and said means forming said longitudinally extending passageways comprises a unitary block having recesses formed therein and open to an outer surface of the block and extending longitudinally therealong, said recesses being enclosed at their outer surfaces by an inner surface of said barrel, and a central bore in said unitary member, said central bore being of sufficient size to receive a helically wound heater, and a helically wound heater mounted in said central bore.

6. The apparatus as specified in claim 1 wherein said support comprises a pitot pressure carrying tube on which the bulkhead means are fixed, said pitot pressure carrying tube extending into the leading end of said barrel, said barrel having a sharp-edged orifice therein open to said pitot pressure carrying tube.

7. The apparatus as specified in claim 1 wherein said support comprises a substantially rigid conduit, and said means for forming said longitudinally extending passageways comprise part-annular tube means mounted to and surrounding said substantially rigid conduit.

8. The probe as specified in claim 1 wherein said means forming said longitudinally extending passageways comprises a unitary block member having outer surface portions which engage the inner surface of the elongated probe barrel, said block having recesses formed therein and extending longitudinally therealong, said recesses being enclosed at their outer surfaces by the inner surface of said barrel, and a central bore in said unitary member opening to a leading end pitot pressure port at the leading end of the barrel.

9. An air data sensing probe for determining air data parameters of fluid moving relative to the probe, and including an elongated tubular probe barrel with a longitudinal axis, said probe barrel having a plurality of port means in the walls thereof for sensing pressures of a fluid, a separately made assembly insertible in the interior of the probe for carrying individual pressures from each of the port means comprising first portions defining a central opening along the longitudinal axis of the assembly, and second portions forming wall portions having outer surfaces for engaging an inner surface of the probe barrel and adapted to be sealingly mounted thereagainst to divide axially spaced and fluidly separate first chambers in the barrel, said wall portions and outer surfaces also forming separate second annularly spaced second chambers from each of the first chambers at the same longitudinal axial location as each of the first chambers, each of said formed chambers being open to at least one separate port in the probe barrel, and means forming longitudinally extending passageways for carrying fluid pressures open to each of the chambers at a forward end portion of said barrel and extending toward a rearward end of said barrel.

10. The probe of claim 9 wherein said second portions forming the first axially spaced chambers comprises bulkhead means axially spaced along a central support which comprises the first portions.

11. The probe of claim 9 and a pitot port defined in a leading end of the barrel to provide a pitot pressure signal, said first portions defining a passageway open to the pitot port and carrying the pitot pressure signal to a rearward end of the barrel.

12. The probe of claim 9 wherein the walls and outer surfaces defining the second chambers comprise wall portions extending radially and axially between the axially spaced first chambers.

13. The probe as specified in claim 9 wherein said means forming said longitudinally extending passageways comprise individual tube members supported as a bundle and having ends open to the respective first and second chambers.

14. The probe as specified in claim 9 and a transition section at a rearward end of said barrel, said transition section including a wall surrounding the means forming the longitudinally extending passageways, second wall means for individually terminating at least some of said longitudinally extending passageways in part-annular chambers formed at said transition section, and conduit means open to each of said part-annular chambers.

15. The probe as specified in claim 14 wherein said conduit means having axes that lie generally along a common plane where they join the wall surrounding the means forming the longitudinally extending passageways.

16. The probe as specified in claim 9 wherein said means forming said longitudinally extending passageways comprises third portions of a unitary member forming the first and second portions and having recesses formed therein on an outer surface thereof and extending longitudinally along the unitary member, said recesses being enclosed at their outer surfaces by an inner surface of said barrel, the central opening comprising a central bore in said unitary member, and a deicing heater mounted in said central bore.

17. The probe of claim 16 wherein said heater comprised a helically wound heater engaging a surface defining the bore and the helically wound heater having an open center portion for carrying fluid pressure.

* * * * *

UNITED STATES PATENT AND TRADEMARK OFFICE
CERTIFICATE OF CORRECTION

PATENT NO. : 5,046,360
DATED : September 10, 1991
INVENTOR(S) : Eric A. Hedberg It is certified that error appears in the above-identified patent and that said Letters Patent is hereby corrected as shown below:

In the Abstract, line 10, after "probe", delete the comma.

Col. 2, line 31, delete "invention" and insert --invention, with--.

Col. 3, line 24, delete "barre" and insert --barrel--.

Col. 6, line 39, delete "!12" and insert --112--.

Col. 6, line 68, after "relative", delete the comma.

Signed and Sealed this

Thirtieth Day of March, 1993

*Attest:*

STEPHEN G. KUNIN

*Attesting Officer*     Acting Commissioner of Patents and Trademarks